United States Patent
Takahashi et al.

(10) Patent No.: US 10,017,675 B2
(45) Date of Patent: *Jul. 10, 2018

(54) METHOD FOR SEPARATING POLISHING MATERIAL AND REGENERATED POLISHING MATERIAL

(71) Applicant: KONICA MINOLTA, INC., Chiyoda-ku (JP)

(72) Inventors: Atsushi Takahashi, Hachioji (JP); Yuuki Nagai, Tachikawa (JP); Akihiro Maezawa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,154

(22) PCT Filed: Dec. 17, 2012

(86) PCT No.: PCT/JP2012/082607
§ 371 (c)(1),
(2) Date: Jun. 19, 2014

(87) PCT Pub. No.: WO2013/099666
PCT Pub. Date: Jul. 4, 2013

(65) Prior Publication Data
US 2015/0013235 A1    Jan. 15, 2015

(30) Foreign Application Priority Data
Dec. 27, 2011    (JP) .................................. 2011-285033

(51) Int. Cl.
   *C02F 1/52*      (2006.01)
   *B01D 21/02*    (2006.01)
   (Continued)

(52) U.S. Cl.
   CPC ........ *C09K 3/1409* (2013.01); *B01D 11/0246* (2013.01); *B24B 57/02* (2013.01);
   (Continued)

(58) Field of Classification Search
   CPC ........... B24B 57/02; B24B 3/06; B24B 57/00; B24B 57/04; C09K 3/14; C09K 3/06;
   (Continued)

(56) References Cited

U.S. PATENT DOCUMENTS 1,997,114 A * 4/1935 Michael ................. B01D 37/03
                                                210/205
2,816,824 A * 12/1957 Wilansky ............. C09K 3/1463
                                                 51/308
(Continued)

FOREIGN PATENT DOCUMENTS

| CN | 101218068 | 7/2008 |
| CN | 101280175 | 10/2008 |

(Continued)

OTHER PUBLICATIONS

Kinzoku-Shigen Report (Report regarding metal resources), 2010, 15 pages.

(Continued)

*Primary Examiner* — Joseph Drodge
(74) *Attorney, Agent, or Firm* — Cozen O'Connor

(57) ABSTRACT

Method for separating a polishing material, which is capable of separating and recovering cerium oxide from a used polishing material that is mainly composed of cerium oxide and a regenerated polishing material which can be obtained by the separation method. This method for separating a polishing material is characterized in that a divalent alkaline earth metal salt is added into the slurry of the used polishing material, while controlling the temperature of the slurry within the range of 10-70 DEG C., thereby causing the (Continued)

polishing material to aggregate under such conditions that the mother liquor has a pH of less than 10.0 as the pH is converted to one at 25 DEG C. so that the polishing material is separated from the mother liquor.

6 Claims, 2 Drawing Sheets

(51) Int. Cl.
*B24B 57/02* (2006.01)
*C09K 3/14* (2006.01)
*B28D 5/00* (2006.01)
*B01D 11/02* (2006.01)

(52) U.S. Cl.
CPC ............ *B28D 5/007* (2013.01); *C02F 1/5209* (2013.01); *C02F 1/5236* (2013.01); *C09K 3/14* (2013.01); *B01D 21/02* (2013.01); *B01D 2221/14* (2013.01); *Y02P 70/179* (2015.11)

(58) Field of Classification Search
CPC .. C09K 3/1409; C09K 3/1454; C09K 3/1463; C01F 17/0043; C02F 1/52; C02F 1/5236; C02F 5/02; C02F 1/5209; C02F 1/5227; C02F 1/5245; C02F 1/5254; C02F 1/5263; C02F 1/5272; C02F 1/5281; B01D 11/0246; B01D 2221/14; B01D 21/02; B28D 5/007; Y02P 70/179
USPC ....... 210/702–739, 660, 665, 670, 749, 767, 210/768; 451/36, 41, 42, 43, 44, 60, 446; 51/307, 309, 298; 423/21.1; 134/10
See application file for complete search history.

(56) References Cited

U.S. PATENT DOCUMENTS

| | | | | |
|---|---|---|---|---|
| 3,877,183 | A * | 4/1975 | Deckert | H01L 21/02024 257/E21.23 |
| 4,419,246 | A * | 12/1983 | Jayawant | 210/721 |
| 5,593,339 | A * | 1/1997 | Yam | B08B 3/06 451/104 |
| 5,647,989 | A * | 7/1997 | Hayashi | B01D 61/14 134/10 |
| 6,001,265 | A * | 12/1999 | Toyama et al. | 210/712 |
| 6,077,407 | A * | 6/2000 | Liehr | C04B 30/02 204/298.02 |
| 6,106,728 | A * | 8/2000 | Iida et al. | 210/743 |
| 6,221,118 | B1 * | 4/2001 | Yoshida et al. | 51/309 |
| 6,258,277 | B1 * | 7/2001 | Salmen et al. | 210/638 |
| 6,299,513 | B1 * | 10/2001 | Tsuihiji et al. | 451/88 |
| 6,656,359 | B1 * | 12/2003 | Osuda et al. | 210/636 |
| 6,746,309 | B2 * | 6/2004 | Tsuihiji et al. | 451/28 |
| 6,821,437 | B1 * | 11/2004 | Eisner et al. | 210/695 |
| 8,202,429 | B2 * | 6/2012 | Abe | B01D 61/025 134/10 |
| 8,894,733 | B2 * | 11/2014 | Moon et al. | 51/309 |
| 9,388,331 | B2 * | 7/2016 | Nakae | C09K 3/1409 |
| 9,701,878 | B2 * | 7/2017 | Nagai | B24B 57/02 |
| 9,796,894 | B2 * | 10/2017 | Takahashi | B24B 57/02 |
| 9,802,337 | B2 * | 10/2017 | Nagai | B28D 5/007 |
| 9,868,187 | B2 * | 1/2018 | Nagai | B24B 55/12 |
| 2004/0016705 | A1 * | 1/2004 | Umezawa et al. | 210/724 |
| 2006/0205325 | A1 * | 9/2006 | Abe | B01J 45/00 451/36 |
| 2007/0204519 | A1 * | 9/2007 | Beppu et al. | 51/309 |
| 2008/0096475 | A1 * | 4/2008 | Yoshida | C09G 1/02 451/60 |
| 2011/0070811 | A1 * | 3/2011 | Neuber | B24B 37/04 451/60 |
| 2014/0144846 | A1 * | 5/2014 | Grabbe et al. | 210/723 |

FOREIGN PATENT DOCUMENTS

| | | |
|---|---|---|
| JP | 06-254764 | 9/1994 |
| JP | 11-050168 | 2/1999 |
| JP | 11-090825 | 4/1999 |
| JP | 2000-87154 | 3/2000 |
| JP | 2000-254659 | 9/2000 |
| JP | 2004-306210 | 11/2004 |
| JP | 2009-083082 | 4/2009 |
| JP | 2010-214515 | 9/2010 |
| JP | 2011-041876 | 3/2011 |
| WO | WO 03/055645 | 7/2003 |
| WO | WO 2007/105714 | 9/2007 |

OTHER PUBLICATIONS

Office Action dated Jul. 5, 2016 which issued in the corresponding Chinese Patent Application No. 201280065120.9.
Office Action dated Jul. 19, 2016 which issued in the corresponding Japanese Patent Application No. 2013-551618.
Office Action dated Dec. 30, 2016 which issued in the corresponding Chinese Patent Application No. 201280065120.9.
Office Action dated May 19, 2017 which issued in the corresponding Korean Patent Application No. 10-2014-7016641.
Office Action dated Apr. 30, 2018 which issued in the corresponding Malaysian Patent Application No. PI 2014701680.

* cited by examiner

METHOD FOR SEPARATING POLISHING MATERIAL AND REGENERATED POLISHING MATERIAL

RELATED APPLICATIONS

This is a U.S. National stage of International application No. PCT/JP2012/082607 filed on Dec. 17, 2012.

This patent application claims the priority of Japanese application no. 2011-285033 filed Dec. 27, 2011, the disclosure content of which is hereby incorporated by reference.

FIELD OF THE INVENTION

The present invention relates to a method for separating an abrasive through collecting a used cerium oxide from a used cerium oxide-containing abrasive to reuse the collected cerium oxide as a regenerated cerium oxide-containing abrasive, and an abrasive regenerated through the method.

BACKGROUND ART

As an abrasive for finely polishing an object (e.g. an optical glass, a glass substrate for an information storage medium and a semiconductor silicon substrate) in a finishing process, a rare-earth oxide material mainly composed of cerium oxide and further containing lanthanum oxide, neodymium oxide and/or praseodymium oxide has been used.

Normally, the rare-earth element which is a main component of an abrasive, especially cerium oxide, relies on imported minerals because this element is obtained from a mineral that is not produced in Japan. A cerium oxide-containing abrasive is composed of fine particles with high degree of hardness and thus important for uses as an optical abrasive for electronic components such as optical lens, semiconductor silicone substrates and glass plates of liquid crystal displays. An abrasive for optical abrasion contains the above-mentioned cerium oxide, and may further contain a metal element(s) such as sodium and chromium and/or a rare-earth element(s) such as yttrium and dysprosium. Thus, an abrasive for optical abrasion is strictly inhibited from being simply disposed in view of environmental pollution. A waste liquid that contains cerium oxide used in polishing is therefore strongly desired to be made non-polluting. Hence, techniques to reuse a resource(s) in a waste liquid of an optical abrasive containing cerium oxide are important also in terms of making a non-polluting liquid.

In various fields of industry, a conventional method for disposing a waste liquid that contains suspended particles normally includes aggregating and separating the suspended particles using a neutralizer, inorganic coagulant or polymeric coagulant, discharging a treated liquid and disposing the aggregated and separated sludge.

A cerium-oxide-containing abrasive is used in large quantity in a polishing process, and its waste liquid also contains a component(s) derived from the polished object (e.g., debris of a polished optical glass). In addition, it is difficult to efficiently separate the abrasive from the component(s) derived from the polished object. Because a waste liquid is disposed after use at present as described above, there are problems concerning environmental burdens and disposal cost.

Thus, it has been important to establish a method for efficiently collecting a main component of an abrasive for recycling the rare-earth element which is a scarce material.

As a method for collecting an abrasive component, Patent Document 1 discloses a solid-liquid separation method including adding an electrolyte is to a used abrasive liquid that contains a cerium oxide-based abrasive for polishing a glass, and maintaining the abrasive liquid temperature at 25° C. for 2 hours to dissolve a component(s) derived from a polished substrate (Si component or Al component), and separate the abrasive and let the abrasive settle out. In a method described in Patent Document 1, an alkali metal hydroxide, alkali metal carbonate, alkali metal salt and ammonium salt are used as the electrolyte.

Patent Document 2 discloses a method including adding poly aluminum chloride and a coagulant composed of a polymer to a used abrasive liquid that contains an abrasive mainly composed of cerium oxide to aggregate a solid component of the used abrasive, performing anhydration to obtain a dehydrated cake of the waste abrasive, mixing the waste abrasive with an aqueous sodium hydroxide or aqueous potassium hydroxide to dissolve a water-soluble impurity(ies), and collecting the abrasive by solid-liquid separation. Patent Document 3 discloses a method including adding sulfuric acid to a used abrasive, applying heat thereto, dissolving a rare-earth element or rare metal, and separating and removing an aggregate of silica etc. in the slurry.

Patent Document 4 discloses a method for collecting a colloidal silica-based abrasive, the method including conducting solid-liquid separation by addition of an alkali to a chemical mechanical polishing (CMP) waste liquid in the presence of a magnesium ion to adjust pH to 10 or higher and cause aggregation, adjusting the pH of the solid component in a pH adjusting tank to 9 or lower to elute the magnesium ion, and collecting the abrasive. Non-Patent Document 1 is a review article regarding the above-described metal-collecting methods.

However, the above methods disclosed by Patent Documents 1 to 4 provide a collected abrasive of insufficient purity. Such a collected abrasive is not suitable for fine polishing.

In the method of Patent Document 4, if an abrasive mainly composed of cerium oxide is used in polishing an object mainly composed of silicon such as a glass, addition of an additive such as magnesium chloride to an abrasive-containing slurry that contains a used abrasive at a pH of 10 or higher causes co-aggregation of an abrasive component and a glass component, which lowers the purity of an obtained regenerated abrasive. This is because when the pH is over 10, a component(s) derived from a polished object mainly composed of silicon (e.g., glass) become easier to aggregate than the abrasive component upon addition of an additive.

Patent Document 5 discloses a method for producing a regenerated cerium oxide-containing abrasive by freezing a collected used liquid to regenerate a secondary particles of cerium oxide followed by removal of water. However, the method of Patent Document 5 requires a huge facilities for conducting the freezing and thus requires enormous initial investment.

PRIOR ART DOCUMENT

Patent Document

Patent Document 1: Japanese Patent Application Laid-Open Publication No. Hei06-254764

Patent Document 2: Japanese Patent Application Laid-Open Publication No. Hei11-90825

Patent Document 3: Japanese Patent Application Laid-Open Publication No. Hei11-50168
Patent Document 4: Japanese Patent Application Laid-Open Publication No. 2000-254659
Patent Document 5: Japanese Patent Application Laid-Open Publication No. 2010-214515

Non-Patent Document

Non-Patent Document 1: Kinzoku-Shigen Report (Report regarding metal resources) p. 45, November 2010

The present invention is made in view of the above-described problems to provide a method for separating an abrasive, the method including separating and collecting cerium oxide from a used abrasive mainly composed of cerium oxide in an efficient and economical manner, and a regenerated abrasive produced by the method.

Means for Solving Problems

The present inventors have earnestly studied given the above problems, and found that a method for separating an abrasive through separating a cerium oxide-containing abrasive from a used abrasive that contains cerium oxide, e.g., an abrasive-containing slurry that contains washing water or an abrasive-containing slurry that was used, the method including: adding a divalent alkali earth metal salt to the used abrasive slurry while the temperature of the used abrasive-containing slurry is regulated in a range from 10 to 70° C. under the condition that does not aggregate a non-abrasive component(s); aggregating the abrasive at a converted pH of less than 10 of a mother liquid at 25° C.; and separating the abrasive from the mother liquid. This method enables collecting cerium oxide from a used abrasive mainly composed of cerium oxide efficiently and economically and obtaining a regenerated abrasive in a simple manner. The present invention has been thus made.

That is, the above object of the present invention is accomplished by the following ways.

1. A method for separating a cerium oxide containing-abrasive from a used abrasive-containing slurry that contains cerium oxide, the method including:
adding a divalent alkali earth metal salt to the used abrasive slurry while a temperature of the used abrasive-containing slurry is regulated in a range from 10 to 70° C.;
aggregating the abrasive at a converted pH of less than 10 of a mother liquid at 25° C.; and
separating the abrasive from the mother liquid.
2. The method of the item 1, wherein
the divalent alkali earth metal salt is a magnesium salt.
3. The method of the item 1 or 2, wherein
the range of the regulated temperature of the used abrasive-containing slurry is from 10 to 40° C.
4. The method of any one of the items 1 to 3, wherein
a separation container used in the method includes a temperature regulator.
5. A regenerated abrasive produced by the method of any one of the items 1 to 4.

Effects of the Invention

By virtue of the above ways of o the present invention, there is provided a method for separating an abrasive, the method including separating and collecting cerium oxide from a used abrasive mainly composed of cerium oxide in an efficient and economical manner, and a regenerated abrasive produced by the method.

The mechanisms of the above effect of the present invention are not fully and definitively revealed, but the following reasoning can be made.

The effect of the present invention is characterized in that the method for selectively collecting cerium oxide which is a main component of an abrasive from the used abrasive-containing slurry in high concentration enables not only collection of cerium oxide but also increases a collection yield of cerium oxide and obtains a regenerated abrasive that contains an impurity(ies) in a low concentration(s) and contains cerium oxide in high purity.

The technical idea is utilizing a presumable specific interaction between cerium oxide and a divalent alkali earth metal salt such as a magnesium salt. It is common to add a coagulant having high specific weight to a used abrasive to separate the used abrasive as a solid component, followed by purification of the cerium oxide for regenerating the abrasive. In the collected cerium oxide which is a solid component or in the abrasive-containing slurry that contains cerium oxide, a glass component derived from a polished object and generated in glass polishing such as silicon dioxide particles are also included. To separate this glass component, various further processes are required.

On the other hand, in the method of the present invention for separating an abrasive, a divalent alkali earth metal salt such as a magnesium salt is added to a used abrasive-containing slurry while the temperature of the used abrasive-containing slurry is regulated in a range from 10 to 70° C. without adding any additives such as a pH adjusting agent, and then cerium oxide is aggregated selectively at a converted pH of less than 10 of a mother liquid at 25° C. so as not to aggregate a non-abrasive glass component. They can be thus efficiently separated. Hence, the method of the present invention can separate cerium oxide selectively in high concentration and does not require a subsequent purification. Thus, the method of the present invention can simplify a step(s) after the separation.

In the present invention, it is needed that a divalent alkali earth metal salt such as a magnesium salt is added to a collected slurry while the temperature of the collected slurry is regulated in a range from 10 to 70° C. without adding a pH adjusting agent and then the converted pH of the mother liquid at 25° C. is maintained to be less than 10 as the pH after the addition of the magnesium salt to the separation of the aggregate. In the present invention, the pH after the addition of a magnesium salt means the pH right after (upon) the end of adding a magnesium salt.

It is also found that the magnesium salt used in collecting an abrasive is partially absorbed in cerium oxide particles and thus remains in the regenerated cerium oxide-containing abrasive, and found that this magnesium salt is bonded to cerium oxide via a peculiar bond and prevents cerium oxide from becoming too fine particles in a future use as an abrasive.

EMBODIMENTS FOR CARRYING OUT THE INVENTION

The method of the present invention for separating an abrasive is a method for separating a cerium oxide-containing abrasive from a used abrasive-containing slurry that contains cerium oxide, the method being characterized in that a divalent alkali earth metal salt such as a magnesium salt is added to the used slurry while the temperature of the used slurry is regulated in a range from 10 to 70° C., the abrasive is then aggregated selectively at a converted pH of less than 10 of a mother liquid at 25° C. so as not to aggregate a non-abrasive component, and thereafter the abrasive is separated from the mother liquid. This feature is common in the inventions of claims 1 to 6.

To achieve the effects of the present invention more sufficiently, the divalent alkali earth metal salt is preferably a magnesium salt, the range of the regulated temperature of the used abrasive-containing slurry is preferably from 10 to 40° C., and a separation container used in the method includes a temperature regulator.

The present invention, and elements and embodiments thereof will now be described in detail. Ranges of values expressed with "(from) A to B" in the following description include the values A and B as the minimum and maximum values of the ranges.

<<Method for Separating Abrasive>>

A flow chart of the whole steps to which the method of an embodiment of the present invention for separating an abrasive is applicable will now be described with reference to the drawings.

Figure 1:
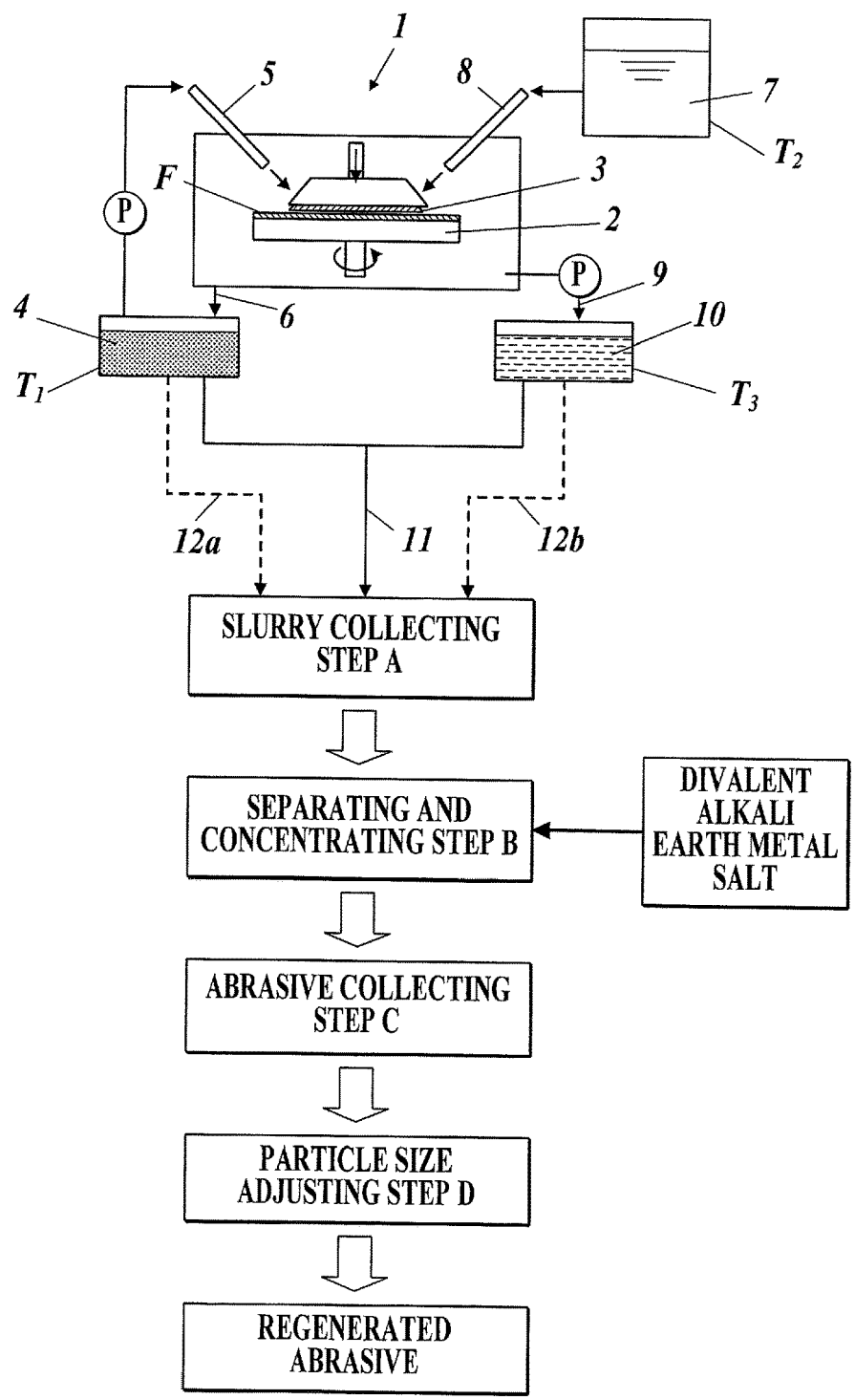
FIG. 1 This is a schematic diagram illustrating a flow chart of elemental steps of the method of the present invention for separating an abrasive.

FIG. 1 is a schematic diagram illustrating a flow chart of elemental steps to which the method of the present invention for separating an abrasive is applicable.

In a polishing process illustrated in FIG. 1, an abrasive device 1 includes an abrasive surface plate 2 on which an abrasive cloth F composed of a non-woven cloth, synthetic resin foam or synthetic leather is adhered. The abrasive surface plate 2 is rotatable. In polishing, the abrasive surface plate 2 is rotated while an object 3 to be polished (e.g., glass) is pushed against the abrasive surface plate 2 with a predetermined pressure force. Simultaneously, a cerium oxide-containing abrasive liquid 4 (i.e., the abrasive-containing slurry) is supplied through a slurry nozzle 5 using a pump. The cerium oxide-containing abrasive liquid 4 which contains the abrasive used in the polishing passes through a flow pass 6 and is then put and pooled in a slurry tank $T_1$. The cerium oxide-containing abrasive liquid 4 is repeatedly circulated through the abrasive device 1 and the slurry tank $T_1$.

Washing water 7 is pooled in a washing water tank $T_2$, and for washing the abrasive device 1, sprayed through a washing water-spraying nozzle 8 to a polishing portion. Then, an abrasive-containing wash liquid 10 passes through a flow pass 9 using a pump and is then put and pooled in a wash liquid tank $T_3$. The wash liquid tank $T_3$ is used for pooling the wash liquid that was used in the washing (rinsing). The pooled liquid is continuously stirred using a stirring blade to avoid sedimentation and aggregation.

The abrasive liquid 4 that is pooled in the slurry tank $T_1$ and was circulated and used and the wash liquid 10 that is pooled in the wash liquid tank $T_3$ are both contain not only particles of cerium oxide which is the abrasive but also a non-abrasive components) removed from the polished object 3 (e.g., glass) which is polished in the polishing process.

Subsequently, the abrasive liquid 4 and the wash liquid 10 are mixed and then collected, or are separately collected. This step is defined as a slurry collecting step A.

Thereafter, to a mixture of or each of the abrasive liquid 4 and the wash liquid 10 which were collected in the slurry collecting step A (the mixture of these liquids is called a mother liquid, and each liquid is also called a mother liquid), a divalent alkali earth metal salt is added as an inorganic salt while the temperature of the mother liquid is regulated in a range from 10 to 70° C. Then, the abrasive is separated from the mother liquid and concentrated at a converted pH of less than 10 of the mother liquid at 25° C. so as not to aggregate a non-abrasive component(s) (e.g., glass powder) to separate the abrasive selectively from the mother liquid (a separating and concentrating step B).

Then, liquid-liquid separation is conducted utilizing spontaneous sedimentation to separate the concentrate which contains the abrasive from a supernatant which contains a non-abrasive component(s). No forcible way is employed in this separation. The mother liquid is thus separated into the supernatant containing the non-abrasive component(s) etc. and the concentrate containing cerium oxide sediment. Thereafter, the supernatant is disposed by decantation, e.g., tilting of the container, or by putting a discharging pipe to reach near the interface between the supernatant and the concentrate in the container so as to discharge only the supernatant from the container and collect the abrasive (an abrasive collecting step C).

In the separated cerium oxide-containing concentrate, particles of cerium oxide form aggregates (i.e., secondary particles) together with the inorganic salt. In order to break the aggregates into almost pure primary particles, water and a dispersing agent are added, and a dispersing device is used to obtain particles with desired sizes (the particle size adjusting step D).

The regenerated abrasive that is low in the concentration (s) of impurities and highly pure can be thus obtained in such a simple manner.

Next, details of the method of the embodiment of the present invention for separating an abrasive and techniques for the method will now be described.

[Abrasive]

Generally, fine particles of Bengala ($\alpha$ $Fe_2O_3$), cerium oxide, aluminum oxide, manganese oxide and/or zirconium oxide, or colloidal silica is dispersed as an abrasive in water or oil to form a slurry, and it is used for polishing optical glasses, semiconductor substrates and the like. On the other hand, an abrasive used in the present invention is mainly composed of cerium oxide. This abrasive is applicable to Chemical Mechanical Polishing (CMP). CMP utilizes mechanical and chemical actions and achieves sufficient speed and highly fine flatness in polishing the surface of a semiconductor substrate or a glass.

Actually, cerium oxide used as an abrasive is preferably not a pure cerium oxide but is so-called bastnasite which is prepared by sintering a mineral ore rich in rare earth elements and crashing the mineral ore. In this cerium oxide, cerium oxide is present as a main component. In addition, other rare earth elements such as lanthanum, neodymium, praseodymium and the like are also contained in the cerium oxide. Fluorides of them may be contained in the cerium oxide in addition to oxides of them.

The composition and shape of cerium oxide used in the present invention is not particularly limited. A commercially available cerium oxide can be used as the abrasive in the present invention. Preferably, the concentration of cerium oxide is 50% by mass or more in cerium oxide to achieve the effects of the present invention more sufficiently.

[Polishing Process]

The abrasive is used in the following way (polishing process). The present invention is a method for separating an abrasive from a used abrasive that is used as described below.

Taking polishing of a glass substrate as an example, a polishing process is normally composed of preparing an abrasive-containing slurry, polishing and washing, as illustrated in FIG. 1.

(1) Preparation of Abrasive-Containing Slurry

Powder of an abrasive mainly composed of cerium oxide is added in an amount of 1 to 15% by mass to a solvent such as water and then dispersed in the solvent to obtain an abrasive-containing slurry. This abrasive-containing slurry is circulated through an abrasive device and used. The cerium oxide powder (fine particles) used as the abrasive has an average size ranging from several dozen nanometers to several micrometers.

By adding a dispersing agent and the like, aggregation of the cerium oxide particles can be prevented. Preferably, dispersing state is maintained by stirring using a stirrer or the like. In general, it is preferable that a tank used for pooling an abrasive-containing slurry is arranged next to an abrasive device, dispersing state is maintained using a stirrer or the like, and the abrasive-containing slurry is supplied to the abrasive device and circulated through the abrasive device using a supplying pump.

(2) Polishing

As illustrated in FIG. 1, a glass substrate is polished by bringing the glass substrate into contact with the abrasive pad (abrasive cloth) and moving the glass substrate and the abrasive pad relative to each other applying pressure force with the supplementation of the abrasive-containing slurry to the contacting portion.

(3) Washing

When the polishing is finished, a large quantity of the abrasive is present on the glass substrate and the abrasive device. Thus, water or the like is supplied in place of the abrasive-containing slurry after the polishing to wash the abrasive to remove it from the glass substrate and the abrasive device, as explained above with reference to FIG. 1. Then, the washing water that contains the abrasive is discharged to the outside of the polishing system.

As a result of the washing, a certain amount of the abrasive is discharged to the outside of the polishing system, and thus the amount of the abrasive in the polishing system is reduced. To make up for this reduction, a fresh abrasive-containing slurry is newly supplied to the slurry tank $T_1$. The addition may be conducted once every polishing process or once every predetermined times of repeated polishing process. Preferably, the abrasive is in a well-dispersed state in the solvent in the supplementation.

[Used Abrasive-Containing Slurry]

In the present invention, the used abrasive-containing slurry is the abrasive-containing slurry discharged to the outside of the system including the abrasive device and the tank used for the abrasive-containing slurry, and is categorized into the following two types.

One is a first abrasive-containing slurry which contains the washing water discharged in the washing process (a rinse slurry), and the other is a second abrasive-containing slurry that was used and is pooled in the slurry tank $T_1$ (a life-ended slurry). In the present invention, they are called the first abrasive-containing slurry and the second abrasive-containing slurry, respectively. The present invention is preferably applied to both of the first abrasive-containing slurry and the second abrasive-containing slurry, but may be applied to either of them.

The first abrasive-containing slurry which contains the washing water is characterized by the following two features.

1) This slurry is discharged in the washing. Thus, this slurry contains a large amount of the washing water and the concentration of the abrasive in this slurry is lower than that of the slurry in the tank.

2) The glass component which was present on the abrasive cloth or the like is included in this slurry as a result of the washing.

On the other hand, the second abrasive-containing slurry is characterized in that the concentration of the glass component is higher than that of a fresh abrasive-containing slurry.

[Regeneration of Cerium Oxide-Containing Abrasive]

In the present invention, the method for separating the abrasive for producing the regenerated cerium oxide-containing abrasive is mainly composed of four steps, namely, the slurry collecting step A, the separating and concentrating step B, the abrasive collecting step C and the particle size adjusting step D.

(1: Slurry Collecting Step A)

In this step, the abrasive-containing slurry discharged from the system composed of the abrasive device and the slurry tank is collected. The slurry to be collected in this step is categorized into the first abrasive-containing slurry which contains the washing water and the second abrasive-containing slurry which was used.

Generally, the concentration of the cerium oxide-containing abrasive in the collected abrasive-containing slurry is 0.1 to 40% by mass.

The collected slurry may be subjected to the separating step immediately after the collection or may be pooled to obtain a certain amount of the collected slurry. In each case, it is preferable to continuously stir the collected slurry to maintain the dispersing state.

In the present invention, the first abrasive-containing slurry and the second abrasive-containing slurry collected in the slurry collecting step A may be mixed with each other to prepare the mother liquid and then subjected to the separating and concentrating step B and the abrasive collecting step C. Otherwise, the first abrasive-containing slurry and the second abrasive-containing slurry collected in the slurry collecting step A may be separately subjected to the separating and concentrating step B and the abrasive collecting step C as the mother liquids independent from each other.

(2: Separating and Concentrating Step B)

Each collected slurry which was used contains a glass component derived from the polished object. The concentration of the abrasive is decreased due to influx of the washing water. To use the slurry again for the polishing, the glass component is required to be separated, and the abrasive component is required to be concentrated.

In the separating and concentrating step B of the method of the present invention for separating an abrasive, a divalent alkali earth metal salt is added to the collected slurry (mother liquid) which was collected in the slurry collecting step A while the temperature of the used abrasive-containing slurry is regulated in a range from 10 to 70° C., the abrasive is then aggregated at a converted pH less than 10 of the mother liquid so as not to aggregate the non-abrasive component(s). Hence, the abrasive component mainly composed of cerium oxide is aggregated, and then sedimentation occurs. Thereafter, the concentrate is separated from the supernatant which contains most of the glass component. Thus, this step enables both of the separation of the cerium oxide component from the glass component and the concentration in the abrasive-containing slurry.

Specific operations will now be described with reference to FIG. 2.

Figure 2:
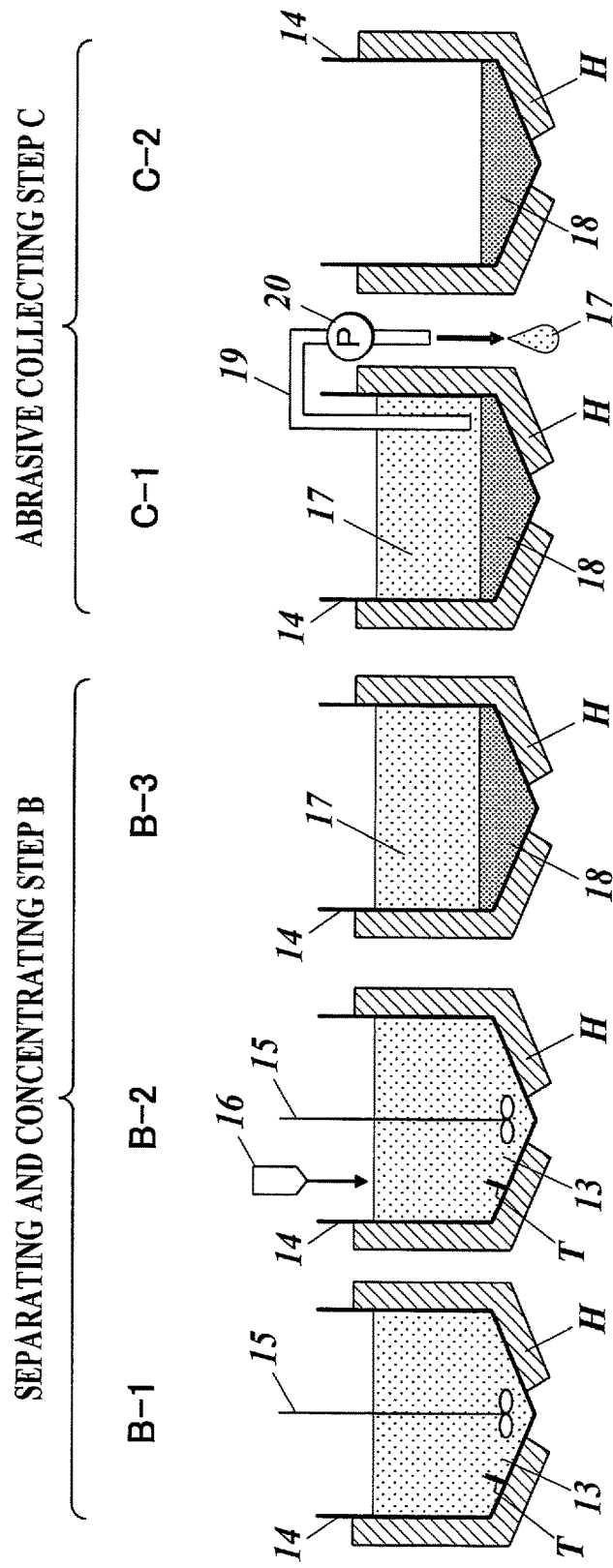
FIG. 2 This is a schematic diagram illustrating an example of a flow in a separating and concentrating step and an abrasive collecting step to which the method of the present invention for separating an abrasive is applicable.

FIG. 2 is a schematic diagram illustrating an example of a flow in a separating and concentrating step B and an abrasive collecting step C to which the method of the present invention for separating an abrasive is applicable.

Step (B-1)

The abrasive-containing slurry (mother liquid) 13 which is collected in the previous step, i.e., the slurry collecting step A, is poured into a separation container 14 equipped with a temperature-detecting tube T, a stirrer 15, and a heat-retaining jacket H which is provided on the outer surface of the separation container. After the abrasive-containing slurry (mother liquid) 13 is poured into the separation container 14, the temperature of the abrasive-containing slurry (mother liquid) 13 is regulated to a predetermined temperature using the heat-retaining jacket H. The regulation of the temperature of the abrasive-containing slurry (mother liquid) 13 to a predetermined temperature is conducted by passing a cooling medium such as a refrigerant and a cooling water or a heating medium such as warm water and steam through the heat-retaining jacket H depending on the temperature of the abrasive-containing slurry (mother liquid) 13 detected by the temperature-detecting tube T.

Step (B-2)

After the temperature of the abrasive-containing slurry (mother liquid) 13 is regulated to a predetermined temperature, a divalent alkali earth metal salt is then added as an inorganic salt from a adding flask 16 to the abrasive-containing slurry (mother liquid) 13 being stirred, and then a converted pH of the mother liquid at 25° C. is maintained to be less than 10.

Step (B-3)

The cerium oxide particles in the abrasive-containing slurry (mother liquid) 13 is selectively aggregated as a result of the addition of the inorganic salt, and then sedimentation of the aggregate occurs to form a concentrate 18. In a supernatant 17 from which the separated sediment of the cerium oxide is separated and settled contains a non-abrasive component(s) such as a glass component. The abrasive and non-abrasive component(s) are thus separated from each other.

<Divalent Alkali Earth Metal Salt>

In the present invention, the inorganic salt used for aggregating the cerium oxide is a divalent alkali earth metal salt.

Examples of the divalent alkali earth metal salt used in the present invention include calcium salts, barium salts, beryllium salts and magnesium salts. Among them, magnesium salts are preferable to achieve the effects of the present invention more sufficiently.

Any electrolyte magnesium salt may be used in the present invention without particular limitation. In terms of high solubility in water, magnesium chloride, magnesium bromide, magnesium iodide, magnesium sulfate and magnesium acetate are preferable. In terms of a small change in pH and easiness of treating the sediment of the abrasive and the waste liquid, magnesium chloride and magnesium sulfate are particularly preferable.

<Method for Adding Divalent Alkali Earth Metal Salt>

A method for adding the divalent alkali earth metal salt will now be described taking a magnesium salt as an example.

a) Concentration of Magnesium Salt

Powder of the magnesium salt may be directly added to the collected slurry, or the magnesium salt may be dissolved in a solvent such as water and then added to the abrasive-containing slurry. It is preferable that the magnesium salt is dissolved in a solvent and then added to the abrasive-containing slurry to obtain homogeneous concentration in the slurry after the addition.

The concentration is preferably 0.5 to 50% by mass in an aqueous solution. To suppress a change in pH of the system and achieve more efficient separation of the glass component, the concentration is preferably 10 to 40% by mass.

b) Temperature in Adding Magnesium Salt

The temperature when the magnesium salt is added may be in the range from the freezing temperature of the collected abrasive-containing slurry to 90° C. To stably regulate the temperature of the abrasive-containing slurry and efficiently separate the glass component, the temperature is preferably 10 to 70° C., and more preferably 10 to 40° C.

c) Speed of Adding Magnesium Salt

Speed of adding the magnesium salt is preferably adjusted so that the concentration of the added magnesium salt in the collected abrasive-containing slurry is not largely changed immediately and the added magnesium salt is homogeneously present in the collected abrasive-containing slurry. The amount of the added magnesium salt per minute is preferably 20% by mass or less, more Preferably 10% by mass or less, per the total amount of the magnesium salt to be added.

d) pH Value after Addition of Magnesium Salt

In the separating and concentrating step B of the present invention, the magnesium salt is added and then separation and concentration is conducted at a converted pH of less than 10 of the mother liquid at 25° C. without adjusting the pH of the collected abrasive-containing slurry in advance. Generally, the collected abrasive-containing slurry exhibits alkalinity and its pH ranges from 8 to less than 10 because of the presence of the glass component. Thus, it is not needed to adjust the pH of the collected abrasive-containing slurry in advance.

In the present invention, the pH is obtained from the measurement at 25° C. using the Lacombe tester bench pH meter (pH1500, manufactured by AS ONE CORPORATION).

In the present invention, the pH is equal to or less than the pH after the addition of the magnesium salt upon the addition of the magnesium salt to the separation of the concentrate. In the present invention, the pH after the addition of the magnesium salt is the pH right after (upon) the end of adding the magnesium salt.

Until the end of separating the concentrate, the pH is equal to or less than the pH after the addition of the magnesium salt. Specifically, the pH which is a converted pH at 25° C. is maintained less than 10, and preferably in a range from 6.5 to less than 10. By maintaining the pH less than 10, the glass component in the waste liquid can be prevented from being aggregated, and thus the purity of the collected cerium oxide can increase. The minimum value of the pH after the addition of the magnesium salt is 6.5 or more considering decrease in the purity due to a pH adjusting agent and handleability.

e) Stirring after Addition of Magnesium Salt

After the addition of the magnesium salt, the stirring is continued for preferably 10 minutes or more, and more preferably 30 minutes or more. Upon the addition of the magnesium salt, the aggregation of the abrasive particles starts. The continuous stirring makes the aggregation state homogeneous in the liquid and reduces the particle size distribution, which makes the following separation easy.

f) Regulation of Temperature after Addition of Magnesium Salt

The method of the present invention for separating an abrasive is characterized at least in that a magnesium salt which is a divalent alkali earth metal salt is added to the abrasive-containing slurry while the temperature of the abrasive-containing slurry is regulated to a temperature in a range from 10 to 70° C.

By regulating the temperature of the abrasive-containing slurry during the addition of a divalent alkali earth metal salt in a range from 10 to 70° C., the abrasive component mainly composed of cerium oxide can be efficiently aggregated and settled selectively and most of the glass component can be made remain in the supernatant. Thus, this regulation enables efficient separation of the cerium oxide component from the glass component.

The temperature of the abrasive-containing slurry is 10 to 70° C., preferably 10 to 60° C., and more preferably 10 to 40° C.

When the temperature of the abrasive-containing slurry is 10° C. or more, solid-liquid separation in the abrasive-containing slurry does not occur and the solubility of the divalent alkali earth metal salt added in the abrasive-containing slurry can be maintained to a preferable extent. Thus, the abrasive component can surely be separated from the non-abrasive component(s) without excessive investment in facilities such as a cooling apparatus. When the temperature of the abrasive-containing slurry is 70° C. or less, the divalent alkali earth metal salt added to the abrasive-containing slurry can sufficiently produce effects. Thus, the abrasive component can surely be separated from the non-abrasive component(s) without adding excessive heat energy.

(3: Abrasive Collecting Step C)

In the separating and concentrating step B, the concentrate 18 is separated from the supernatant 17 which contains the glass component, and then the concentrate 18 is collected, as illustrated in FIG. 2.

a) Method for Separating Aggregate of Abrasive

A commonly-used method for separating an aggregate can be used as the method for separating the concentrate of the aggregated abrasive which is obtained by adding the magnesium salt from the supernatant. For example, spontaneous sedimentation can be utilized to remove only the supernatant for separating the supernatant. A method utilizing physical actions such as a method using a centrifugal separator can also be employable. In terms of the purity of the regenerated cerium oxide-containing abrasive, a method utilizing spontaneous sedimentation is preferable.

In the sedimentation state, its specific weight is higher than that of the collected slurry because the supernatant is separated, and thus the cerium oxide is concentrated. The concentration of the cerium oxide in this concentrated slurry is higher than that of the collected slurry.

For example, the separation of the concentrate of the aggregated abrasive from the supernatant can be conducted as follows. As illustrated in FIG. 2, the concentrate 18 which contains the cerium oxide settled at the bottom is separated from the supernatant 17 which contains the non-abrasive component(s) utilizing spontaneous sedimentation as the step (B-3). Thereafter, the discharging pipe 19 is put in the container 14 to reach near the interface between the supernatant 17 and the concentrate 18, and then only the supernatant 17 is discharged to the outside of the container using the pump 20, as the step (C-1). Subsequently, the concentrate 18 which contains the abrasive is collected as the step (C-2).

(4: Particle Size Adjusting Step D)

In the method of the present invention for separating an abrasive, the particle size distribution of particles of the cerium oxide is adjusted as a final step to make the used abrasive collected through the above steps reusable.

The collected concentrate containing the cerium oxide obtained by adding the magnesium salt or the like is composed of lumps of secondary particles. Thus, for the purpose of the reuse, it is preferable to conduct the particle size adjusting step D to cause re-dispersion through breaking the aggregate into pure particles (i.e., primary particles) as a final step.

In the particle size adjusting step D, the aggregated abrasive component generated in the separating and concentrating step B is re-dispersed to adjust the particle size distribution to be equivalent to that in the un-treated abrasive slurry.

Examples of the method for re-dispersing the aggregated abrasive particles are as follows: a) water is added to lower the concentration of the magnesium ion in the liquid; b) a metal-separating agent (or a dispersing agent) is added to lower the concentration of the magnesium ion on/in the abrasive; and c) the aggregated abrasive particles is cracked using a dispersing device or the like.

One of these methods can be used alone, or two or more of them may be used in combination. Preferably, any two of the methods a), b) and c) are used in combination. More preferably, all of the methods a), b) and c) are used in combination.

In the case of adding water, the amount of water to be added is adjusted based on the volume of the concentrated slurry. Generally, the amount of water is 5 to 50% by volume of the concentrated slurry, and preferably 10 to 40% by volume of the concentrated slurry.

Preferable examples of the metal-separating agent (dispersing agent) include agents composed of a poly-carboxylic acid-based polymer. An acrylic acid-maleic acid copolymer is particularly preferable. Specifically, POLITY A-550 (manufactured by Lion Corporation) is given as an example. The amount of the metal-separating agent (dispersing agent) to be added to the concentrated slurry is preferably 0.01 to 5% by volume.

Examples of the dispersing device include ultrasonic dispersers and media mills such as sand mills and bead mills. Ultrasonic dispersers are particularly preferable.

For example, ultrasonic dispersers are available from SMT Corporation, Ginsen Corporation, TAITEC Corporation, BRANSON, Kinematica AG, and NISSEI Corporation. Examples include UDU-1 and UH-600MC manufactured by SMT Corporation, GSD600CVP manufactured by Ginsen Corporation and RUS600TCVP manufactured by NISSEI Corporation. The frequency of ultrasonic is not particularly limited.

Examples of circulating type devices that conduct mechanical stirring and ultrasonic dispersion simultaneously include, but are not limited to, UDU-1 and UH-600MC manufactured by SMT Corporation, GSD600CVP and GSD1200RCVP manufactured by Ginsen Corporation and RUS600TCVP manufactured by NISSEI Corporation.

The particle size adjusting step D can be conducted as follows, for example: to the concentrate prepared in the abrasive collecting step C in the separation container, a) water is added to lower the concentration of the magnesium salt in the liquid to prepare a cerium oxide-dispersing liquid and pools it in the conditioning container. Then, the metal-separating agent (dispersing agent composed of a polymer) is added to the cerium oxide-dispersing liquid being stirred using a stirrer. Thereafter, the resulting liquid is subjected to dispersion to break the aggregated particles of the cerium oxide using an ultrasonic disperser. Subsequently, the particle size distribution is monitored using a particle size measuring device provided in the downstream of the ultrasonic disperser. Upon confirming that the particle size distribution has reached a desired value, a three-way valve is controlled, and the resulting cerium oxide-dispersing liquid is brought out of the system. The regenerated abrasive can be thus obtained.

Preferably, a change with time of the particle size distribution obtained in this step is small, and a change in the particle size after one day has passed is small.

[Cerium Oxide-Containing Regenerated Abrasive]

In the present invention, the particle size distribution of the regenerated cerium oxide-containing abrasive obtained through the particle size adjusting step D as a final product is difficult to change with time. The concentration is higher than that after the collection. The concentration of magnesium is preferably ranges from 0.0005 to 0.08% by mass, and the concentration(s) of the other component(s) are preferably 1.0% by mass or less in total.

The regenerated abrasive obtained by the method for separating an abrasive contains a slight amount of the divalent alkali earth metal salt such as a magnesium salt. Generation of too fine particles in the use of the regenerated abrasive can therefore be suppressed and the regenerated abrasive can polish an object equivalently to a fresh abrasive.

EXAMPLE

The present invention will now be described in detail with reference to Examples, but the present invention is not limited thereto. The percent sign "%" in the following description means "% by mass" unless described otherwise.

<<Preparation of Regenerated Abrasive>>

Preparation of Regenerated Abrasive 1: Present Invention

A regenerated abrasive 1 was prepared through the following steps.

1) Slurry Collecting Step A

After a glass substrate for a hard disc was polished as a polishing process illustrated in FIG. 1, 210 liters of the first abrasive-containing slurry which contained the washing water and 30 liters of the second abrasive-containing slurry which had been used were collected, and then mixed to obtain 240 liters of the collected slurry in total. The specific weight of this collected slurry was 1.03, and the collected slurry contained 8.5 kg of the cerium oxide.

2) Separating and Concentrating Step B

Subsequently, the collected slurry was transferred to a separation container. Then the temperature of the collected slurry was regulated at 20±1° C., and 2.5 liters of 10% aqueous liquid by mass of magnesium chloride was added to the collected slurry spending 10 minutes while the collected slurry was stirred so as to avoid sedimentation of the cerium oxide. The converted pH value right after (upon) the end of adding magnesium chloride at 25° C. was 8.60, and this pH was maintained.

3) Abrasive Collecting Step C

The stirring was continued for 30 minutes maintaining the above condition, and then the resulting slurry was left to stand for 1.5 hours to separate the aggregated particles and let it settle out from the supernatant utilizing spontaneous sedimentation. After 1.5 hours had passed, the supernatant was discharged using the discharging pump in accordance with the step (4) in FIG. 2, and the concentrate was separated and collected. The volume of the collected concentrate was 60 liters.

4) Particle Size Adjusting Step D (Dispersing Step)

To the separated concentrate, 12 liters of water was added. In addition, 300 g of POLITY A-550 (Manufactured by Lion Corporation) was added as the metal-separating agent (dispersing agent composed of a polymer) to the separated concentrate, followed by stirring for 30 minutes. Thereafter, the aggregated particles were broken and dispersed using an ultrasonic disperser.

After the dispersion was completed, then filtration was conducted using a membrane filter with a pore size of 10 μm to obtain the regenerated cerium oxide-containing abrasive 1. The concentration of the cerium oxide was 8.7% by mass, and the particle size D90 was less than 2.0 μm. The concentration of magnesium in the regenerated abrasive was 0.01% by mass.

Preparation of Regenerated Abrasive 2: Present Invention

A regenerated abrasive 2 was prepared by the same way as the regenerated abrasive 1 was prepared except that magnesium sulfate was used in place of magnesium chloride as the inorganic salt used in 2) the separating and concentrating step B.

Preparation of Regenerated Abrasive 3: Comparative Example

A regenerated abrasive 3 was prepared by the same way as the regenerated abrasive 1 was prepared except that the temperature was regulated to 5° C. in 2) the separating and concentrating step B.

Preparation of Regenerated Abrasives 4 to 8: Present Invention

Regenerated abrasives 4 to 8 were prepared by the same way as the regenerated abrasive 1 was prepared except that the temperatures were regulated to 10° C., 30° C., 40° C., 50° C., 70° C., respectively, in 2) the separating and concentrating step B.

Preparation of Regenerated Abrasive 9: Comparative Example

A regenerated abrasive 9 was prepared by the same way as the regenerated abrasive 1 was prepared except that the temperature was regulated to 80° C. in 2) the separating and concentrating step B.

Preparation of Regenerated Abrasive 10: Comparative Example

A regenerated abrasive 10 was prepared by the same way as the regenerated abrasive 1 was prepared except that potassium carbonate was used in place of magnesium chloride as the inorganic salt used in 2) the separating and concentrating step B.

Preparation of Regenerated Abrasive 11: Comparative Example

A regenerated abrasive 11 was prepared by the same way as the regenerated abrasive 1 was prepared except that the pH of the collected slurry (mother liquid) was adjusted to 10.10 using potassium hydroxide as the inorganic salt after the addition of magnesium chloride as the pH adjusting agent to the collected slurry in 2) the separating and concentrating step B.

Preparation of Regenerated Abrasive 12: Comparative Example

A regenerated abrasive 12 was prepared by the same way as the regenerated abrasive 1 was prepared except that the pH of the collected slurry (mother liquid) was adjusted to 10.80 using potassium hydroxide as the pH adjusting agent after the addition of magnesium chloride as the inorganic salt to the collected slurry in 2) the separating and concentrating step B.

<<Evaluation of Regenerated Abrasive>>

[Evaluation for Purity of Regenerated Abrasive: Evaluation for Separability from Glass Component]

In the preparation of the above regenerated abrasives 1 to 12, samples were taken from the collected slurries before the addition of the inorganic salt in 2) the separating and concentrating step B and from the supernatants after the standing and the separation. The taken samples were then subjected to component analysis using an ICP Atomic Emission spectrometer. If the concentration of cerium in the sample from the supernatant was lower than that in the sample from the un-treated collected slurry and the concentrations of silicon did not differ from each other, it is concluded that only the cerium oxide particles settled out and the glass particles which are not derived from the abrasive did not settle out and remained in the supernatant. On the other hand, if the concentration of cerium and the concentration of silicon in the sample from the supernatant are both lower than those in the sample from the un-treated collected slurry, it is concluded that the cerium oxide particles and the glass particles both settled out and thus they are not sufficiently separated from each other.

(Component Analysis Using ICP Atomic Emission Spectrometry)

The concentrations of the cerium component and the glass component (Si) in each sample from the separated supernatant were measured using ICP Atomic Emission Spectrometry, and compared to those in each sample from the untreated used slurry (i.e., the slurry to which no additive was added). Specific steps are described below.

<Preparation of Sample Solution A>

(a) 1 ml of a sample was taken from the un-treated collected slurry or the supernatant being stirred using a stirrer (b) 5 ml of hydrofluoric acid for atomic absorption was added to the sample (c) silica was eluted by ultrasonic dispersion (d) the sample was left to stand at room temperature for 30 minutes (e) ultrapure water was added to the sample to obtain a volume of 50 ml Each sample liquid prepared through the above steps is called the sample liquid A.

<Quantification of Si and Mg>

(a) the sample liquid A was filtrated using a membrane filter (hydrophilic PTFE)

(b) the filtrate was subjected to measurement using an Inductivity Coupled Plasma Atomic Emission spectrometer (ICP-AES)

(c) Si was quantified through a standard addition method, and Mg was quantified through a calibration-curve method using matrix matching <Quantification of Cerium>

(a) 5 ml of a sample was taken from the sample liquid in a well dispersing state (b) 5 ml of high-purity sulfuric acid was added to the above taken sample (c) ultrapure water was added to the resulting sample to obtain a volume of 50 ml (d) the resulting sample was diluted as needed and subjected to measurement using ICP-AES (e) cerium was quantified through a calibration-curve method using matrix matching <ICP Atomic Emission Spectrometer>

An ICP-AES manufactured by SII nanotechnology Inc. was used.

<<Evaluation for Energy Efficiency>>

Energy quantities required in the separation and the concentration in the separating and concentrating step B in preparing the regenerated abrasives 1 to 12 were compared from each other. Defining the energy quantity required by the regenerated abrasive 1 as Rank A, energy efficiencies of the regenerated abrasives 1 to 12 were evaluated on the basis of the following criteria.

S: energy efficiency was less than 0.95 times of that of the regenerated abrasive 1

A: energy efficiency was from 0.95 to 1.05 times of that of the regenerated abrasive 1

B: energy efficiency was from 1.06 to 1.10 times of that of the regenerated abrasive 1

C: energy efficiency was 1.11 times or more of that of the regenerated abrasive 1

Results from the measurements are shown in Table 1.

In table 1, pHs are converted pHs at 25° C.

TABLE 1

| Regenerated abrasive No. | Inorganic salt | pH of slurry after addition of inorganic salt | Regulated temperature in Separating and concentrating step B | Result of analysis of supernatant using ICP | | Energy efficiency rank | Note |
|---|---|---|---|---|---|---|---|
| | | | | Si concentration | Ce concentration | | |
| 1 | Magnesium chloride | 8.60 | 20 | 998 | 34 | A | Present Invention |
| 2 | Magnesium sulfate | 8.94 | 20 | 941 | 45 | A | Present Invention |
| 3 | Magnesium chloride | 8.60 | 5 | 967 | 331 | C | Comparative Example |
| 4 | Magnesium chloride | 8.60 | 10 | 969 | 57 | B | Present Invention |
| 5 | Magnesium chloride | 8.60 | 30 | 906 | 32 | A | Present Invention |

TABLE 1-continued

| Regenerated abrasive No. | Inorganic salt | pH of slurry after addition of inorganic salt | Regulated temperature in Separating and concentrating step B | Result of analysis of supernatant using ICP | | Energy efficiency rank | Note |
|---|---|---|---|---|---|---|---|
| | | | | Si concentration | Ce concentration | | |
| 6 | Magnesium chloride | 8.60 | 40 | 892 | 31 | A | Present Invention |
| 7 | Magnesium chloride | 8.60 | 50 | 792 | 30 | B | Present Invention |
| 8 | Magnesium chloride | 8.60 | 70 | 684 | 27 | B | Present Invention |
| 9 | Magnesium chloride | 8.60 | 80 | 361 | 24 | C | Comparative Example |
| 10 | Pottasium carbonate | 9.86 | 20 | 186 | 30 | A | Comparative Example |
| 11 | Magnesium chloride | 10.10 | 20 | 91 | 26 | A | Comparative Example |
| 12 | Magnesium chloride | 10.80 | 20 | 61 | 18 | A | Comparative Example |
| Reference value: Un-treated slurry | | | | 1060 | 5400 | | |

As evident from the results shown in Table 1, the method of the present invention for separating an abrasive is excellent in separability of the cerium oxide (i.e., the abrasive) from the glass component (i.e., the non-abrasive component) in the settling and separating and in economical characteristics (i.e., energy efficiency). The present invention can therefore provide a higher-purity regenerated abrasive, compared to the methods of Comparative Examples for separating an abrasive.

INDUSTRIAL APPLICABILITY

The method of the present invention for separating an abrasive can be suitably applied to regenerate an abrasive used in fine polishing in a finishing process of optical glasses and crystal oscillators, because the method of the present invention can efficiently collect cerium oxide and can provide a regenerated abrasive in a simple manner.

DESCRIPTION OF REFERENCE SIGNS

1 Abrasive device
2 Abrasive surface plate
3 Polished object
4 Abrasive liquid
5 Slurry nozzle
7 Washing water
8 Washing water-spraying nozzle
10 Abrasive-containing wash liquid
13 Abrasive-containing slurry (Mother liquid)
14, 21 Separation container
15 Stirrer
16 Adding flask
17 Supernatant
18 Concentrate
19 Discharging pipe
20 Pump
F Abrasive cloth
H Heat retaining jacket
T Temperature detecting tube
$T_1$ Slurry tank
$T_2$ Washing water tank
$T_3$ Wash liquid tank

The invention claimed is:

1. A method for separating a cerium oxide containing-abrasive from a used abrasive-containing slurry that contains the cerium oxide containing abrasive and a component derived from a polished object that has been polished in an abrasive device, the method comprising:
   collecting the used abrasive-containing slurry discharged from the abrasive device;
   adding a divalent alkali earth metal salt to the collected-used abrasive-containing slurry to form a mother liquid while a temperature of the collected-used abrasive-containing slurry is regulated in a range from 10 to 70° C.;
   aggregating the abrasive when the mother liquid has a property of measured or converted pH of lower than 10 at 25° C. so that sedimentation of the abrasive occurs, the aggregated abrasive settles, and a supernatant solution containing the component derived from the polished object is formed; and
   isolating the abrasive from the mother liquid;
   wherein the cerium oxide containing-abrasive is mainly comprised of cerium oxide rare earth material, optionally also containing one or more additional rare earth elements, and the polished object is a glass.

2. The method of claim 1, wherein the divalent alkali earth metal salt is a magnesium salt.

3. The method of claim 1, wherein the range of the regulated temperature of the used abrasive-containing slurry during the adding step is from 10 to 40° C.

4. The method of claim 1, wherein the collecting step comprises collecting the used abrasive slurry discharged from the abrasive device in a separation container, which comprises a temperature regulator, and the adding step comprises adding the divalent alkali earth metal salt to the collected abrasive slurry in the separation container.

5. The method of claim 1, wherein the polished object comprises silicon.

6. The method of claim 1 wherein the glass is selected from the group consisting of optical glasses, glass substrates for information storage mediums, semiconductor silicon substrates, and glass plates of liquid crystal displays.

* * * * *